| Phase | Micro-hardness kg/mm$^2$ |
|---|---|
| Cu | |
| Cu$_2$O | 210 |
| CuO | 260 |
| CoO | 295 |
| Co$_2$O$_3$ | 310 |
| Al$_2$O$_3$ | 1950 |
| Cement | 690-1130 |
| SiO$_2$ | 700 |

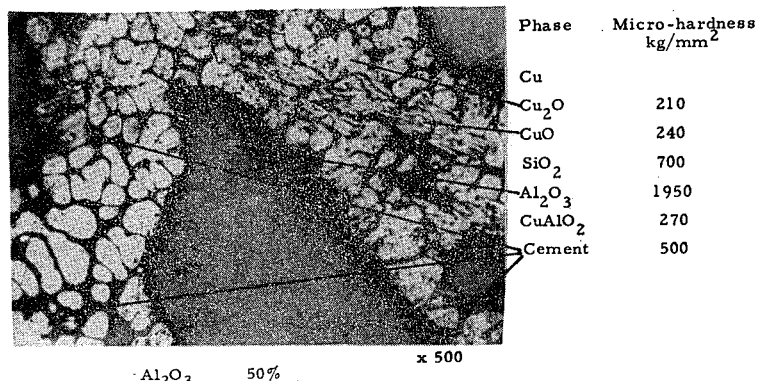
a
| Phase | Micro-hardness kg/mm$^2$ |
|---|---|
| Cu | |
| Cu$_2$O | 210 |
| CuO | 240 |
| SiO$_2$ | 700 |
| Al$_2$O$_3$ | 1950 |
| CuAlO$_2$ | 270 |
| Cement | 500 |
x 500
Al$_2$O$_3$ 50%
SiO$_2$ 4%
Cu 46%
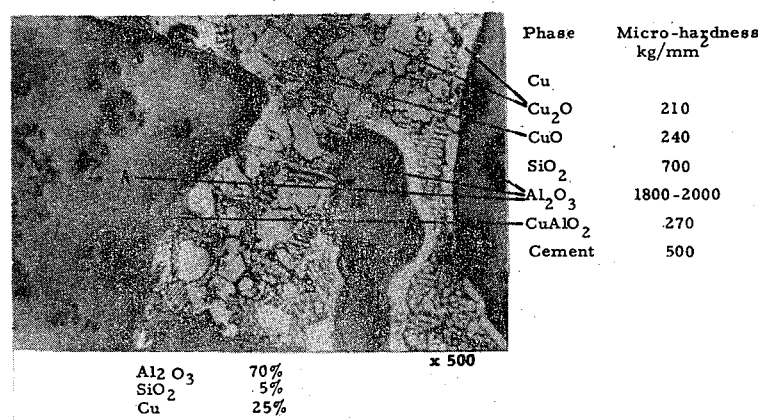
b
| Phase | Micro-hardness kg/mm$^2$ |
|---|---|
| Cu | |
| Cu$_2$O | 210 |
| CuO | 240 |
| SiO$_2$ | 700 |
| Al$_2$O$_3$ | 1800-2000 |
| CuAlO$_2$ | 270 |
| Cement | 500 |
x 500
Al$_2$O$_3$ 70%
SiO$_2$ 5%
Cu 25%
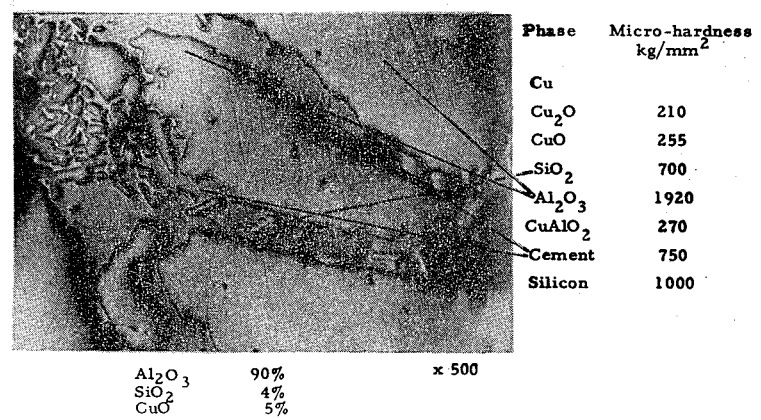
c
| Phase | Micro-hardness kg/mm$^2$ |
|---|---|
| Cu | |
| Cu$_2$O | 210 |
| CuO | 255 |
| SiO$_2$ | 700 |
| Al$_2$O$_3$ | 1920 |
| CuAlO$_2$ | 270 |
| Cement | 750 |
| Silicon | 1000 |
x 500
Al$_2$O$_3$ 90%
SiO$_2$ 4%
CuO 5%
Fig. 2.
INVENTOR.
AUREL I. BERGHEZAN
BY John F. Hohmann
ATTORNEY Dec. 27, 1966         A. I. BERGHEZAN                3,294,496
                   METAL CERAMIC COMPOSITIONS
Filed Nov. 29, 1963                              4 Sheets-Sheet 3

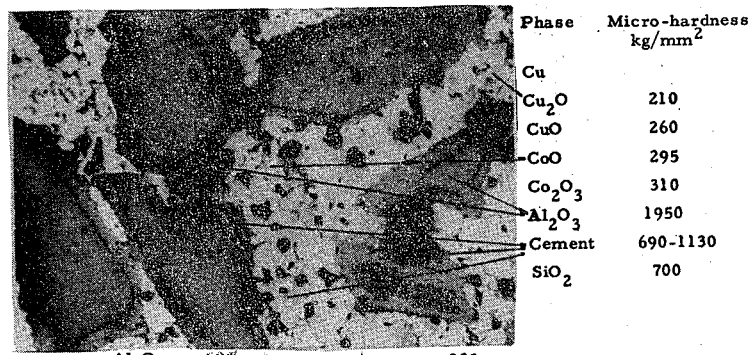

Al$_2$O$_3$  50%   x 300
SiO$_2$   5%
Cu       20%
Co       25%

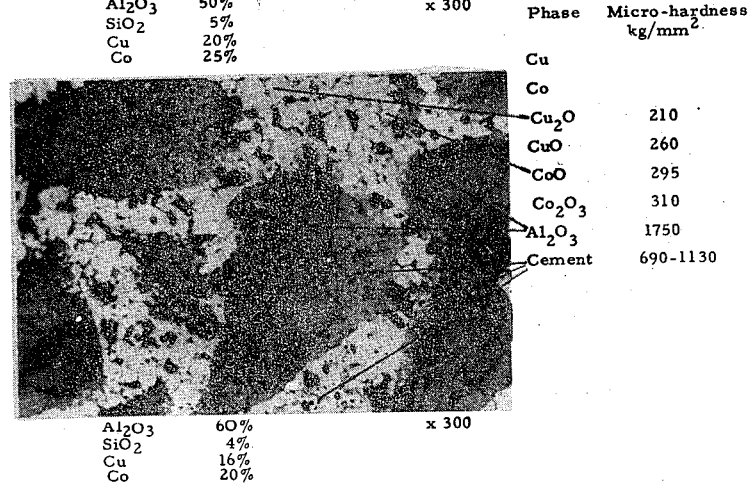

| Phase | Micro-hardness kg/mm$^2$ |
|---|---|
| Cu | |
| Co | |
| Cu$_2$O | 210 |
| CuO | 260 |
| CoO | 295 |
| Co$_2$O$_3$ | 310 |
| Al$_2$O$_3$ | 1750 |
| Cement | 690-1130 |

Al$_2$O$_3$  60%   x 300
SiO$_2$   4%
Cu       16%
Co       20%

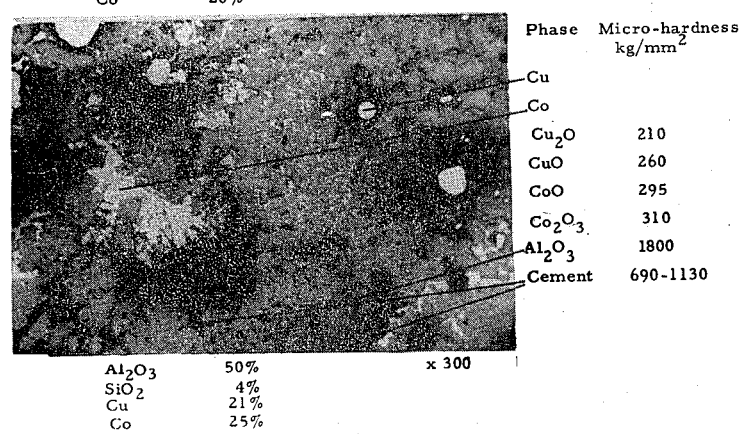

| Phase | Micro-hardness kg/mm$^2$ |
|---|---|
| Cu | |
| Co | |
| Cu$_2$O | 210 |
| CuO | 260 |
| CoO | 295 |
| Co$_2$O$_3$ | 310 |
| Al$_2$O$_3$ | 1800 |
| Cement | 690-1130 |

Al$_2$O$_3$  50%   x 300
SiO$_2$   4%
Cu       21%
Co       25%

*Fig. 3.*

INVENTOR.
AUREL I. BERGHEZAN
BY John F. Hohmann
ATTORNEY

Dec. 27, 1966   A. I. BERGHEZAN   3,294,496
METAL CERAMIC COMPOSITIONS
Filed Nov. 29, 1963   4 Sheets-Sheet 4
a
| Phase | Micro-hardness kg/mm² |
|---|---|
| Cu | |
| Cu₂O | 210 |
| CuO | 240 |
| SiO₂ | 700 |
| Al₂O₃ | 1800-2000 |
| CuAlO₂ | 270 |
| Cement | 500 |
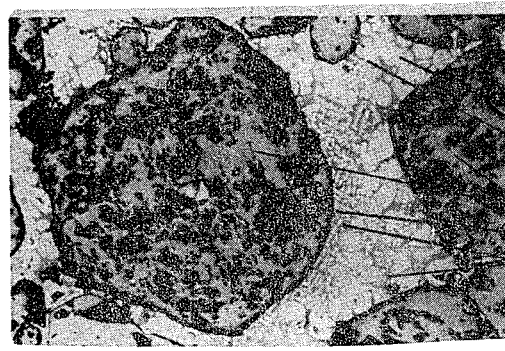
b
| Phase | Micro-hardness kg/mm² |
|---|---|
| Cu | |
| Cu₂O | 210 |
| CuO | 240 |
| SiO₂ | 700 |
| Al₂O₃ | 1800-2000 |
| CuAlO₂ | 270 |
| Cement | 500 |
c
| Phase | Micro-hardness kg/mm² |
|---|---|
| Cu | |
| Cu₂O | 210 |
| CuO | 255 |
| SiO₂ | 700 |
| Al₂O₃ | 1920 |
| CuAlO₂ | 270 |
| Cement | 750 |
| Silicon | 1000 |
50% Al₂O₃
5% SiO₂
20% Si
25% Cu
Fig. 4.
INVENTOR.
AUREL I. BERGHEZAN
BY John F. Hohmann
ATTORNEY Patented Dec. 27, 1966

3,294,496
METAL CERAMIC COMPOSITIONS
Aurel I. Berghezan, Brussels, Belgium, assignor to Union Carbide Corporation, a corporation of New York
Filed Nov. 29, 1963, Ser. No. 326,764
12 Claims. (Cl. 29—182.5)

This invention relates to metal ceramic compositions.

There is a need today in many applications for materials which are strong at high temperature and also are resistant to oxidation at such high temperatures. Among available materials which should have the highest performance at high temperatures are the ceramic materials. Generally they are strong, resistant to creep and have excellent resistance to oxidation. However, for many applications they are far too brittle to be useful and generally are quite susceptible to thermal shock failure. On the other hand, metals, which are more ductile and less prone to thermal shock failure, are susceptible to destructive oxidation at high temperatures.

The possibility of combining the good high temperature properties of ceramic materials with the properties of metals has been advanced many times and has been rather thoroughly explored in the hope of producing a material superior to either the ceramic or the metal alone. Unfortunately, although numerous combinations of metals and oxides have been tried, the strengths of the resulting materials are low with respect to pure sintered oxide or pure metal. If the ceramic material predominates, the strength approximates but is below that of the pure ceramic, and similarly, if the metal phase predominates, the strength is usually substantially below that of the pure metal.

It is the principal object of this invention to provide a metal ceramic composition which is hard, strong and resistant to oxidation, and, in short, effectively combines the good properties of both metal and ceramic. It is another object of the invention to provide a metal ceramic composition which is not only useful in itself but can also be used in the preparation of materials of somewhat different characteristics and compositions.

The invention by means of which these objects are attained is based upon the discovery that a strong bond between metal and ceramic phases in a metal ceramic composition depends upon the presence of a multi-component system having a eutectic such that upon heating a mixture of metal or metal oxide and a ceramic constituent containing silica and alumina, a liquid phase which will wet and dissolve or be partially dissolved in the ceramic constituent of the composition is produced. The multi-component system must be at least ternary. Furthermore the binder between constituents should have a coefficient of thermal expansion of the same order as that of the ceramic constituent.

In the accompanying drawing:

FIG. 2 is a group of photomicrographs illustrating the structure of compositions embodying the invention.

FIGS. 3 and 4 are similar to FIG. 2.

Figure 1:
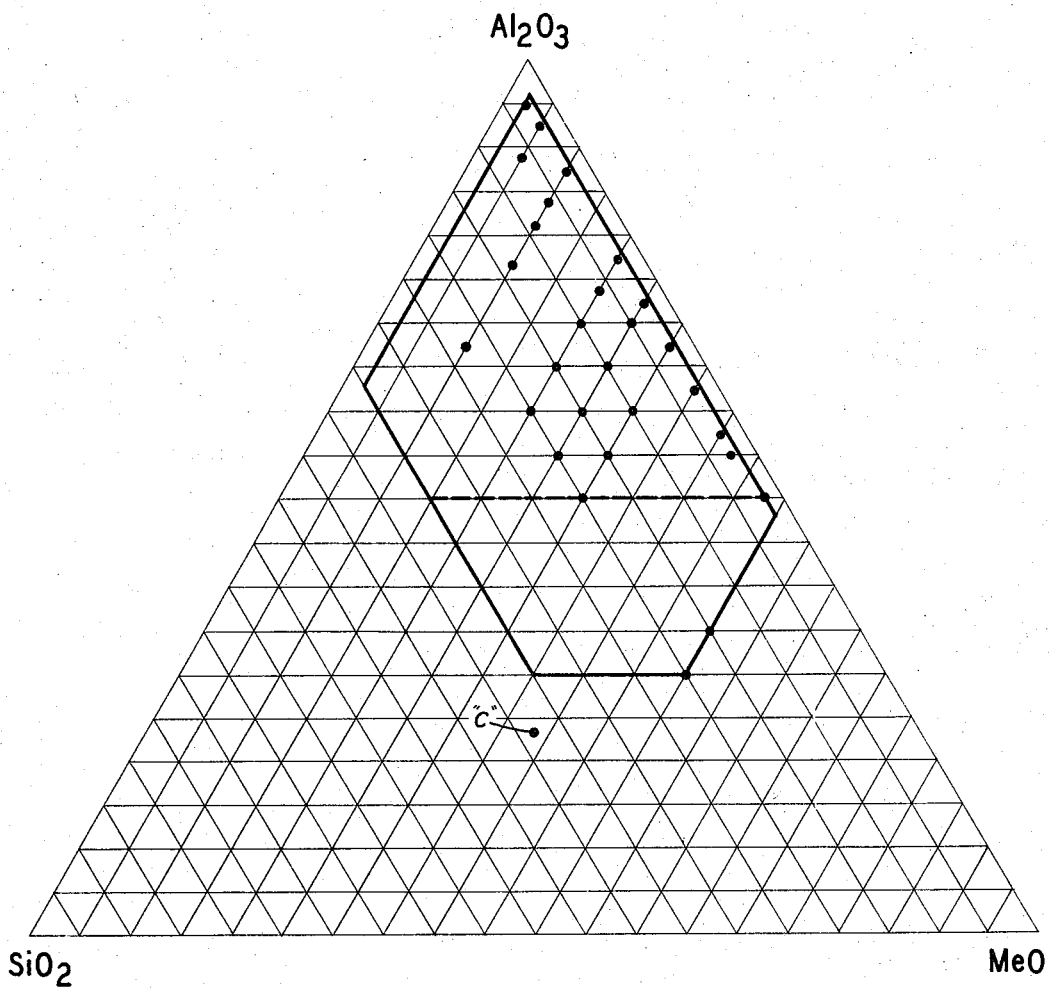
FIG. 1 is a ternary composition diagram setting forth compositions embodying the invention.

The present invention comprises a metal ceramic composition consisting essentially of 2% to 50% by weight of a first constituent composed of at least one material selected from the group consisting of copper, silver, manganese, zinc, nickel, cobalt, iron and/or oxides thereof; 2% to 35% of at least one material selected from the group consisting of silica and germania; the remainder alumina and incidental impurities, the silica or germania content preferably being between about 0.5 and 1.5 times the content of said first constituent. Of the metals and oxides referred to as being present in said first constituent of the composition of the invention, copper, silver, manganese and cobalt and/or their oxides are generally preferred. Compositions containing copper and/or its oxides have so far proved to have the best all around properties. It is advantageous that copper, copper oxide or silver to be present in compositions embodying the invention from the standpoint of ease of manufacture for they can be prepared at relatively low temperatures. However for applications requiring good high temperature properties other more refractory metals or oxides should be used.

For desired hardness and low friability, when copper alone is used to prepare the composition of the invention, at least 2 percent by weight is necessary. If copper oxides are used, about 5 percent by weight is a preferred minimum. Generally with a given copper or copper oxide content increasing the silica content within the ratio indicated above increases hardness.

It is essential that silica or germania be present in the composition of the invention. For conciseness the term "silica" will be used hereinafter to include silica, germania, or mixtures thereof unless otherwise indicated. Elemental silicon may be present; when it is used, the composite will contain free metal by reason of the reaction of silicon with oxygen of the metal oxide and the production of silicon monoxide which volatilizes. As the silica content is increased hardness of the metal ceramic increases. If silica is omitted composites of the metal or metal oxide and alumina are friable. It is convenient in preparing the composition of the invention to use commercial alumina cements which contain silica. A cement of this type available in Europe is known as "Degussa Streichmasse." It contains about 96 percent alumina and 4 percent silica with traces of magnesium, calcium, iron and other metals as impurities. A similar cement available in the United States is known as "Alfrax ET-103." It contains about 92 percent alumina and about 6.5 percent to 7 percent silica with traces of other oxides. It is pointed out that these cements do not contain significant quantities of germania.

As stated, the remainder of the composition is alumina. Because the composition is primarily intended for high temperature use, and alumina is essential to good high temperature properties, it is generally preferred that the alumina content be as high as possible. It should usually be present in a quantity of at least 50 percent by weight of the composition. For different applications, the composition may be varied between the stated limits. As just indicated above, in contrast to usual metal ceramic techniques, it is preferred not to use pure alumina but to use an alumina cement containing silica. If pure alumina is used, silica must be added separately to the composition.

Fundamentally, the composition of the invention is ternary in character, being composed of a metal, silica, and alumina. It may however, contain more than three constituents as indicated. It is necessary that an oxide of the selected metal be present in the composition for the attainment of maximum strength. This metal oxide wets the alumina in the composition, wetting action being enhanced by the silica to give a very strong bond. Although more than one metal oxide may be used in the composition, as above stated, copper is presently generally preferred when used alone. In some respects, mixtures of copper and cobalt and copper and silver have very useful properties, copper-cobalt mixtures producing harder compositions than copper alone, for example.

One of the great advantages of the composition of the invention is the ease with which it may be prepared. The desired constituents are simply mixed in powder form with sufficient water, alcohol, or other volatile liquid to moisten the mixture to make it easily workable. The moist mixture is then shaped as desired and dried by heating, say to about 110° C., if water is used. The formed and dried shaped article is then sintered in air at a temperature above the melting point of the oxide of the metal present in the first constituent.

As stated above, it is essential that oxide of the metal present in the first constituent of the composition of the invention be present at some stage of preparation of the composition. Because sintering is accomplished by heating in air, the metal oxide may form in situ, and it is therefore possible to utilize oxide-free metal powders in preparing the mixture if desired.

Shrinkage during sintering is of course a problem familiar in the art and a result usually to be avoided. In preparing the composition of the invention it is desirable that the particle sizes of the powders be appropriately distributed as in a graded aggregate to avoid excessive shrinkage and excessive porosity.

As a typical method of preparing a composition embodying the invention the following may be cited:

A mixture of finely powdered copper and alumina crucible cement ("Degussa") containing 4 percent silica by weight was prepared. The mixture, containing by weight 10 percent copper and 90 percent cement, was moistened with water, molded to shape and dried by heating at 110° C. The dried, shaped article was then sintered in air in a furnace by heating between 1100° C. and 1350° C. for 30 minutes. The resulting article was extremely hard.

Articles prepared in the manner described are usually inherently porous. This porosity may be overcome by infiltrating an article so prepared. For example, molten copper or copper oxide may be added to a porous sintered body of alumina and silica, adjusting the proportions of the materials to produce a composition within the desired range, or powdered alumina may be sintered in known manner and infiltrated with a molten composition of copper oxide and silica. Still another way of producing a composition embodying the invention is to prepare a melt of copper oxide, alumina and silica, for instance at a temperature of about 1350° C. for a melt containing, say, about 20% $Al_2O_3$; 40% CuO and 40% $SiO_2$ and to add excess alumina to the melt. If the temperature is held substantially constant, only a portion of the added alumina can be dissolved. If the temperature of the melt is raised while alumina is added, or after the addition is complete, more alumina can be dissolved. Thus by regulating the temperature of the melt, it is possible to control the quantity of alumina that is dissolved. Any desired excess of alumina remains embedded as crystalline material in the solidified melt. It is possible by this technique to produce a material containing as much as 95% alumina. For a material intended for high temperature application it is desirable to raise the temperature of the melt to near the melting point of alumina.

In the following table are set forth a number of different compositions typifying the invention, all prepared by cold pressing and sintering in the manner described above. The specimens used were discs of 25.4 mm. diameter. Unless otherwise indicated the compositions listed in the table were sintered at 1350° C. for 30 minutes. Friability was measured by rubbing the specimens against a SiC disc. In the table "D"$Al_2O_3$ refers to "Degussa"

| Composition | | Electrical Resistance |
|---|---|---|
| Metal or Oxide | Ceramic | |
| 2% Cu | 98% "D"$Al_2O_3$ | Infin. |
| 5% Cu | 95% "D"$Al_2O_3$ | Infin. |
| 10% Cu | 90% "D"$Al_2O_3$ | Infin. |
| 20% Cu | 80% "D"$Al_2O_3$ | Infin. |
| 25% Cu | 75% "D"$Al_2O_3$ | Infin. |
| 25% Cu | 70% $Al_2O_3$; 5% $SiO_2$ | Infin. |
| 25% Cu | 65% $Al_2O_3$; 10 $SiO_2$ | Infin. |
| 25% Cu | 55% $Al_2O_3$; 20% $SiO_2$ | Infin. |
| 40% Cu | 60% "D"$Al_2O_3$ | Infin. |
| 50% Cu | 50% "D"$Al_2O_3$ | Infin. |
| 5% CuO | 95% "D"$Al_2O_3$ | Infin. |
| 10% CuO | 90% "D"$Al_2O_3$ | Infin. |
| 20% CuO | 80% "D"$Al_2O_3$ | Infin. |
| 25% CuO | 75% "D"$Al_2O_3$ | Infin. |
| 30% CuO | 70% "D"$Al_2O_3$ | $2 \times 10^6$ ohm/cm. |
| 40% CuO | 60% "D"$Al_2O_3$ | $1.5 \times 10^5$ ohm/cm. |
| 50% CuO [a] | 50% "D"$Al_2O_3$ | $5 \times 10^4$ ohm/cm. |
| 5% $Ag_2O$ | 95% "D"$Al_2O_3$ | Infin. |
| 10% $Ag_2O$ | 90% "D"$Al_2O_3$ | Infin. |
| 20% $Ag_2O$ | 80% "D"$Al_2O_3$ | Infin. |
| 25% $Ag_2O$ | 75% "D"$Al_2O_3$ | N.D. |
| 30% $Ag_2O$ | 70% "D"$Al_2O_3$ | N.D. |
| 40% $Ag_2O$ | 60% "D"$Al_2O_3$ | N.D. |
| 50% $Ag_2O$ | 50% "D"$Al_2O_3$ | N.D. |
| 5% Cu [b] | 95% "A"$Al_2O_3$ | N.D. |
| 10% Cu [b] | 90% "A"$Al_2O_3$ | N.D. |
| 20% Cu [b] | 80% "A"$Al_2O_3$ | N.D. |
| 20% Cu [c] | 80% "A"$Al_2O_3$ | N.D. |
| 25% Cu; 25% Co [d] | 50% "D"$Al_2O_3$ | Infin. |
| 37.5% Cu; 2.5% Co [d] | 50% "D"$Al_2O_3$ | $1 \times 10^6$ ohm/cm.[2] |
| 20% Cu; 10% Fe [e] | 70% "D"$Al_2O_3$ | $1.5 \times 10^5$ ohm/cm.[2] |
| 20% CuO | 20% $SiO_2$; 60% $Al_2O_3$ | Infin. |
| 25% CuO | 20% $SiO_2$; 55% $Al_2O_3$ | Infin. |
| 30% CuO | 20% $SiO_2$; 50% $Al_2O_3$ | Infin. |
| 50% CuO | 20% $SiO_2$; 30% $Al_2O_3$ | Infin. |
| 20% CuO | 15% $SiO_2$; 65% $Al_2O_3$ | Infin. |
| 25% CuO | 15% $SiO_2$; 60% $Al_2O_3$ | Infin. |
| 30% CuO | 15% $SiO_2$; 55% $Al_2O_3$ | Infin. |
| 50% CuO | 15% $SiO_2$; 35% $Al_2O_3$ | Infin. |
| 20% CuO | 10% $SiO_2$; 70% $Al_2O_3$ | Infin. |
| 25% CuO | 10% $SiO_2$; 65% $Al_2O_3$ | Infin. |
| 30% CuO | 10% $SiO_2$; 60% $Al_2O_3$ | Infin. |
| 10% $MnO_2$ | 5% $SiO_2$ + 85% "D"$Al_2O_3$ | Infin. |
| 10% $MnO_2$ | 10% $SiO_2$ + 80% "D"$Al_2O_3$ | Infin. |
| 10% $MnO_2$ | 20% $SiO_2$ + 75% "D"$Al_2O_3$ | Infin. |
| 10% $MnO_2$ | 90% "D"$Al_2O_3$ | Infin. |
| 10% CuO | 10% $SiO_2$ + 80% "D"$Al_2O_3$ | Infin. |
| 10% CuO | 20% $SiO_2$ + 70% "D"$Al_2O_3$ | Infin. |
| 25% NiO | 75% "D"$Al_2O_3$ | Infin., somewhat friable. |
| 25% ZnO | 75% "D"$Al_2O_3$ | Infin., somewhat friable; broke. |
| 25% CoO | 75% "D"$Al_2O_3$ | Do. |

[a] Sintered at 1,200° C. 1 hour.
[b] Sintered at 1,250° C. 30 min.
[c] Sintered at 1,300° C. 30 min.
[d] Sintered at 1,350° C. 1 hour.
[e] Sintered at 1,200° C. 30 min.

alumina cement and "A"Al₂O₃ refers to "Alfrax" alumina cement. Under "composition" is listed the starting material for the metal constituent which in some cases was the powdered metal and in others was the oxide.

The compositions listed in the table above are shown in the ternary diagram of FIG. 1, the constituent comprising metal and/or metal oxide being referred to simply as "MeO" whether the metal was copper, silver or other metal, since for practical purposes the metals are interchangeable in the invention.

The compositions listed in the table generally were hard and opaque. They had high compression strength and good resistance to thermal shock. Generally their hardness was greater than that of glass approaching that of pure alumina. None was friable under the conditions of test except where indicated.

Microscopic study indicated that a number of phases may be present, including excess alumina, excess silica, excess metal and/or metal oxide, and a ternary metal oxide-alumina-silica homogeneous binder phase. In silver-containing compositions, metallic silver is always present. Typical microphotographs are illustrated in FIGS. 2, 3, and 4 of the drawing, legends indicating the phases determined to be present and microhardness values of each phase, obtained with a conventional testing device, and being tabulated. Those phases visible in the areas shown in the photomicrographs are connected by lead lines to the legends. The metal oxide-alumina-silica binder phase is the subject of another patent application, Ser. No. 326,819, filed concurrently herewith. A typical composition for this material is shown at "C" in FIG. 1 of the drawing.

In those compositions containing silver it was observed that the hardness of the materials was quite constant when the silver content was about 25% to 50% of the composition but that below 25% silver hardness decreased. Compositions containing less than 2% copper were made but were quite fragile, and those compositions containing less than 2% silver were friable.

Other tests made of the compositions listed above included a simple break test in which a disc of about 25.4 mm. diameter and 2 to 3 mm. thickness was subjected to shear force by hand by placing an edge of a disc at an acute angle on a support and attempting to break the disc. Unless otherwise indicated none of the tabulated compositions could be broken in this way, but other samples outside the composition limits given above were easily broken, many of them shattering into many pieces.

Thermal shock tests were conducted by rapidly heating samples of the materials with a torch to about 2000° C. to 3000° C. so that a portion of the sample melted and then rapidly removing the torch and cooling to room temperature. No cracks were observed in any composition embodying the invention so heated.

The composition of the invention in addition to being hard, strong and resistant to failure from thermal shock may be made an electrical insulator or electrically conductive. It may be joined to metals by welding and brazing techniques. Its combination of properties recommend it for use in applications where strength, hardness and resistance to wear at high temperatures are encountered. Those compositions of the invention having a low melting constituent are particularly suitable for use in transpiration cooling applications.

As used herein and in the claims the term "copper oxidic" is intended to refer to any oxidized state of the metal.

What is claimed is:
1. A metal-ceramic composition consisting essentially of 2% to 50% weight of a first constituent composed of at least one material selected from the group consisting of copper, silver, manganese, zinc, nickel, cobalt, iron and oxides thereof; 2% to 35% of at least one material selected from the group consisting of silica and germania; the remainder alumina and incidental impurities, the silica germania group content being between about 0.5 and 1.5 times the first constituent content, said composition having a binder phase at least ternary and comprising (a) oxide of a metal selected from the group of metals of said first constituent, (b) alumina, and (c) material selected from said silica-germania group.

2. A composition as defined in claim 1 in which said first constituent is copper oxidic.

3. A composition as defined in claim 1 in which said first constituent is a mixture of silver oxide.

4. A composition as defined in claim 1 in which said first constituent is a mixture of copper oxidic and silver.

5. A composition as defined in claim 1 in which said first constituent is a mixture of copper oxidic and cobalt.

6. An article composed of sintered alumina, the normally occurring pores in said article being infiltrated with the metal ceramic composition defined in claim 1.

7. An article composed of a sintered metal ceramic composition as defined in claim 1, the normally occurring pores in said article being infiltrated with additional first constituent selected from said group.

8. A composition as defined by claim 1 wherein the alumina content is at least 50%.

9. A composition as defined by claim 1 wherein the alumina content is greater than 50% and at least a portion thereof is present in finely dispersed crystalline form.

10. A method of making a metal ceramic composition containing a multi component, at least ternary, solid solution of metal oxide, silica and alumina, and finely dispersed therein crystalline alumina, which method comprises forming a melt containing 2% to 50% of at least one material selected from the group consisting of copper, silver, cobalt, manganese, zinc, nickel, iron and oxides thereof; 2% to 35% of at least one material selected from the group consisting of silica and germania; the remainder alumina and incidental impurities; and adding excess finely divided alumina to said melt while raising the temperature thereof and maintaining the same under oxidizing conditions and solidifying said melt.

11. A composite article comprising a metal-ceramic composition as defined in claim 1 and bonded thereto a metal body.

12. An article as defined by claim 11 wherein said metal body is copper.

References Cited by the Examiner

UNITED STATES PATENTS

| | | | |
|---|---|---|---|
| 2,011,173 | 8/1935 | Crowley | 106—65 |
| 2,224,595 | 12/1940 | Dawihl | 75—206 |
| 2,311,228 | 2/1943 | Heany | 106—65 |
| 2,431,660 | 11/1947 | Gaudenzi | 75—206 |
| 2,470,269 | 5/1949 | Schaefer | 75—206 |
| 2,580,171 | 12/1951 | Mattiasson et al. | 75—124 |
| 2,681,862 | 6/1954 | Fisher | 106—65 |
| 2,784,105 | 3/1957 | Stedman et al. | 75—206 |
| 2,843,501 | 7/1958 | Ellis et al. | 29—182.1 |
| 2,899,323 | 8/1959 | Veuable | 106—65 |
| 2,922,721 | 1/1960 | Tarkan et al. | 117—105 X |
| 2,961,325 | 11/1960 | Mayfield | 106—65 X |
| 3,080,261 | 3/1963 | Fritts et al. | 117—113 X |
| 3,093,593 | 6/1963 | Arrauce | 264—62 X |
| 3,128,194 | 4/1964 | Christie | 106—65 X |
| 3,180,742 | 4/1965 | Bennett et al. | 29—182.5 X |
| 3,214,250 | 10/1965 | Peras et al. | 75—206 X |

FOREIGN PATENTS 824,124  11/1959  Great Britain.

L. DEWAYNE RUTLEDGE, *Primary Examiner.*

REUBEN EPSTEIN, LEON D. ROSDOL, *Examiners.*

R. L. GOLDBERG, R. L. GRUDZIECKI,
*Assistant Examiners.*